United States Patent
Feinberg

(10) Patent No.: US 12,269,606 B2
(45) Date of Patent: Apr. 8, 2025

(54) AIRCRAFT

(71) Applicant: The Boeing Company, Arlington, VA (US)

(72) Inventor: Michael A. Feinberg, Mill Creek, WA (US)

(73) Assignee: The Boeing Company, Arlington, VA (US)

(*) Notice: Subject to any disclaimer, the term of this patent is extended or adjusted under 35 U.S.C. 154(b) by 0 days.

(21) Appl. No.: 18/460,291

(22) Filed: Sep. 1, 2023

(65) Prior Publication Data
US 2025/0074618 A1     Mar. 6, 2025

(51) Int. Cl.
*B64D 37/04*     (2006.01)
*B64C 7/00*      (2006.01)

(52) U.S. Cl.
CPC ............... *B64D 37/04* (2013.01); *B64C 7/00* (2013.01)

(58) Field of Classification Search
CPC ................................. B64D 37/04; B64C 7/00
See application file for complete search history.

(56) References Cited

U.S. PATENT DOCUMENTS

| | | | | |
|---|---|---|---|---|
| 1,499,817 A * | 7/1924 | Fokker | ................... | B64D 37/04 244/135 R |
| 1,774,342 A * | 8/1930 | Vought | ................... | B64D 37/04 244/135 R |
| 2,925,712 A | 2/1960 | Johnson et al. | | |
| 7,998,392 B2 * | 8/2011 | Eggink | ..................... | B64C 7/00 264/261 |
| 9,637,234 B2 * | 5/2017 | Gallant | ..................... | B64C 1/00 |
| 11,807,383 B2 * | 11/2023 | Dean | ....................... | B64D 37/04 |
| 2009/0189021 A1 | 7/2009 | Hasmann | | |
| 2013/0067905 A1 | 3/2013 | Eckert | | |
| 2014/0183301 A1 * | 7/2014 | Mora Ordonez | ......... | B64C 7/00 244/118.1 |
| 2015/0069184 A1 | 3/2015 | Barmichev et al. | | |
| 2021/0207540 A1 | 7/2021 | Roberge | | |
| 2023/0024316 A1 | 1/2023 | Ribeiro | | |
| 2023/0107610 A1 | 4/2023 | Minas et al. | | |

FOREIGN PATENT DOCUMENTS

| | | | | |
|---|---|---|---|---|
| GB | 2591253 A | * | 7/2021 | ............. B64D 37/04 |
| GB | 2591255 A | * | 7/2021 | ............. B64C 7/00 |
| RU | 2499740 C2 | * | 11/2013 | |
| WO | WO-2021040660 A1 | * | 3/2021 | ............. B64D 37/04 |

OTHER PUBLICATIONS

David L. Daggett, The Boeing Company, Water Injection Feasibility for Boeing 747 Aircraft (NASA Glenn Research Center, Working Paper No. 2005-213656, Dec. 2005).
Hitchens, Frank E. "B." The Encyclopedia of Aerodynamics, Andrews UK Limited, Luton, Bedfordshire, 2015, p. 80, https://books.google.com/books?id=izv0CgAAQBAJ&pg=PT80#v=onepage&q&f=false.

* cited by examiner

*Primary Examiner* — Magdalena Topolski
(74) *Attorney, Agent, or Firm* — Kolitch Romano Dascenzo Gates LLC

(57) ABSTRACT

Aircraft comprise a fuselage, wings coupled to the fuselage, a wing-to-body fairing operatively coupled relative to the fuselage and the wings and defining a fairing volume between the wing-to-body fairing and at least the fuselage, and a fairing fuel tank positioned within the fairing volume.

20 Claims, 3 Drawing Sheets

AIRCRAFT

FIELD

The present disclosure relates to aircraft.

BACKGROUND

Commercial air flight supply and demand are constantly changing. At times there is a need for very large capacity airliners to travel long distances (e.g., internationally), but at other times the demand is not present to fill such very large airliners. In such instances, a mid-sized airliner may be better suited for the demand, but typical mid-sized airliners may not have the fuel capacity for such long flights.

SUMMARY

Aircraft comprise a fuselage, wings coupled to the fuselage, a wing-to-body fairing operatively coupled relative to the fuselage and the wings and defining a fairing volume between the wing-to-body fairing and at least the fuselage, and a fairing fuel tank positioned within the fairing volume.

DESCRIPTION

Figure 1:
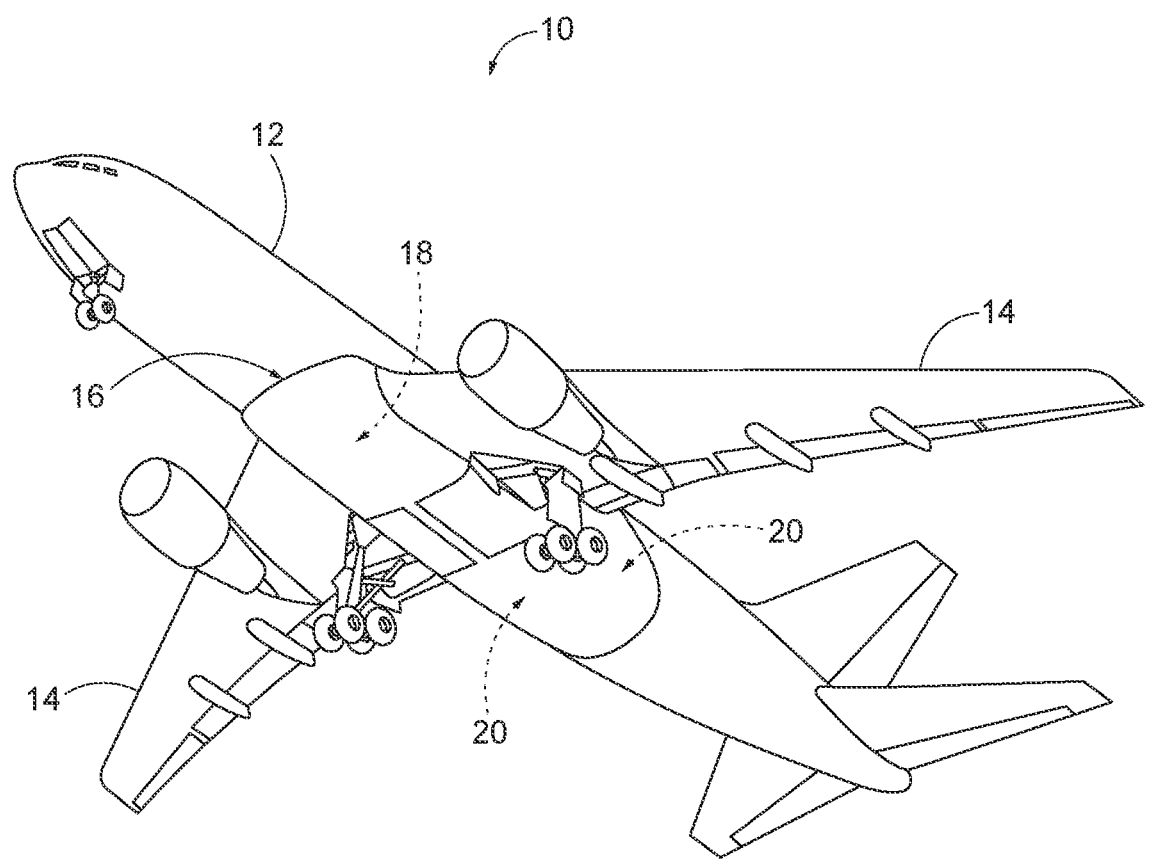
FIG. 1 illustrates an example aircraft according to the present disclosure.

With reference initially to the example aircraft illustrated in FIG. 1, aircraft 10 according to the present disclosure comprise at least a fuselage 12, wings 14 coupled to the fuselage 12, a wing-to-body fairing 16 that is operatively coupled relative to the fuselage 12 and the wings 14 and that defines a fairing volume 18 between the wing-to-body fairing 16 and at least the fuselage 12, and a fairing fuel tank 20 that is positioned within the fairing volume 18. Aircraft 10 according to the present disclosure additionally or alternatively may be described as airliners or as fixed-wing aircraft. Aircraft 10 may be commercial aircraft, passenger aircraft, cargo aircraft, and/or military aircraft. With inclusion of the fairing fuel tank 20, more fuel may be carried by aircraft 10 than similarly sized aircraft without a fairing fuel tank, resulting in a longer range of flight. Airliners and other fixed-wing aircraft often comprise fuel tanks within the peripheral wings and the center wing box of the aircraft. Some aircraft also include a fuel tank or tanks within the cargo compartment of the aircraft, such some such fuel tanks being optional and selectively deployed. That is, some aircraft may have a cargo-compartment fuel tank added when needed and removed when not needed. When used, however, such cargo-compartment fuel tanks take up valuable cargo space that otherwise may be utilized for cargo.

Figure 2:
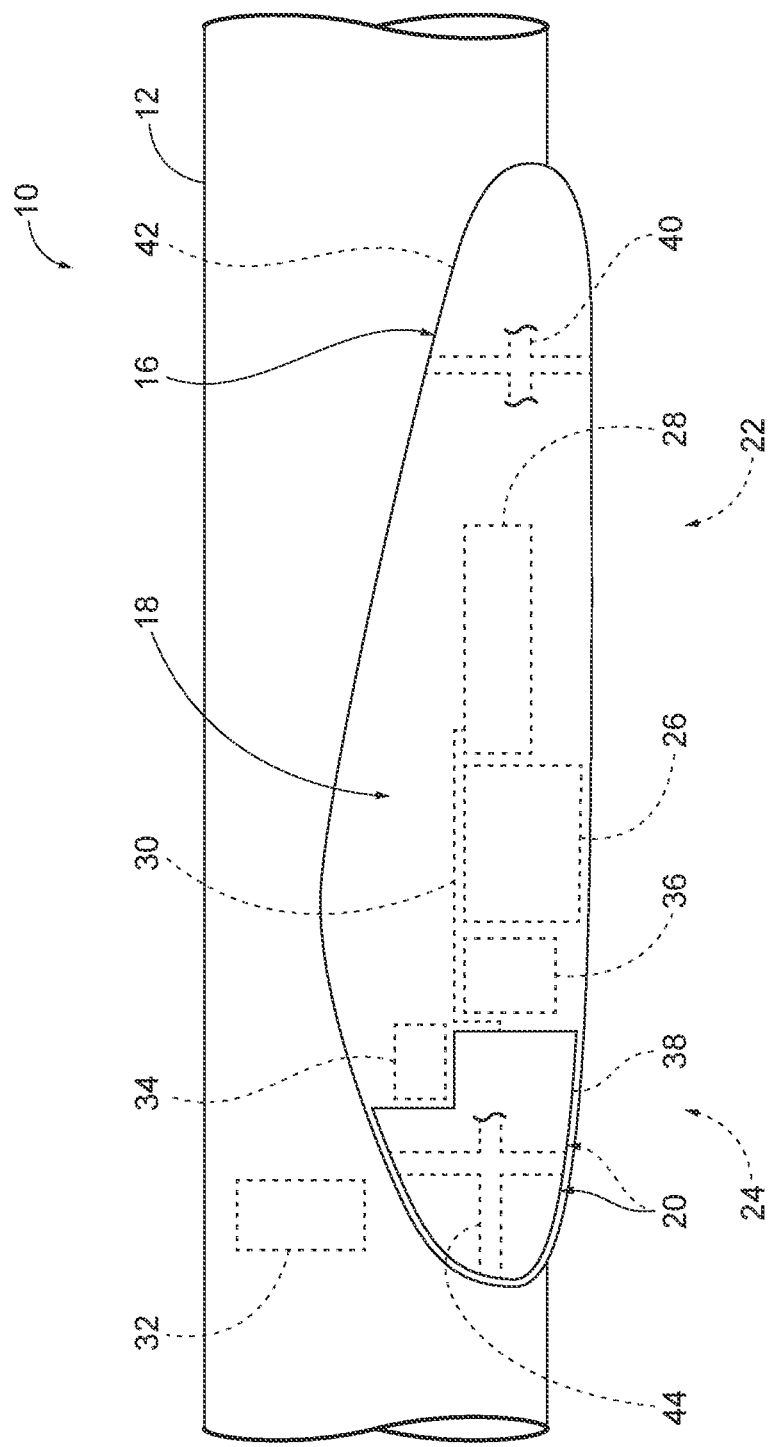
FIG. 2 is a schematic illustration representing aircraft according to the present disclosure.

Turning to FIG. 2, elements that are likely to be included in a given example of an aircraft 10 are illustrated in solid lines, while elements that are optional to a given example or that correspond to a specific example are illustrated in broken lines. As schematically represented in FIG. 2, and as introduced above with reference to FIG. 1, aircraft 10 comprise at least a fuselage 12, wings 14, a wing-to-body fairing 16, and a fairing fuel tank 20 that is positioned within a fairing volume 18. Wing-to-body fairings provide an aerodynamic surface between the fuselage and wings of an aircraft.

As schematically represented in FIG. 2, in some examples of aircraft 10, the fairing volume 18 may be described as having a forward region 22 and an aft region 24 that is positioned aft of the forward region 22, and the fairing fuel tank 20 is positioned solely within the aft region 24. For example, the aft region 24 may comprise a rear 50%, a rear 30%, or a rear 20% of the fairing volume 18. In some examples, the fairing fuel tank 20 may substantially fill the aft region 24 of the fairing volume 18. By "substantially fill," it is meant that the fairing fuel tank 20 fills at least 75% of the designated region of the fairing volume 18. In other words, a fairing fuel tank 20 may take advantage of a maximum amount of otherwise unused space within the fairing volume 18.

Some examples of aircraft 10 further comprise a wheel well 26 that extends through the fairing volume 18 and that houses the aircraft's landing gear. In some such examples of aircraft 10, the fairing fuel tank 20 is positioned solely aft of the wheel well 26. In some such examples and as schematically represented in FIG. 2, the aircraft 10 further comprises a wing-center fuel tank 28 that is positioned forward of the wheel well 26. As implied, a wing-center fuel tank 28 is a fuel tank that is positioned within the center wing box of an aircraft. When present, the fairing fuel tank 20 may be fluidly coupled to the wing-center fuel tank 28. In some such examples, the fairing fuel tank 20 may serve as an extension of the wing-center fuel tank 28 without requirement of a crew member to initiate use of the fairing fuel tank 20. In other examples, the fairing fuel tank 20 may be controlled separately from the wing-center fuel tank 28 and thus serve as a reserve fuel tank that requires a crew member to initiate use of the fairing fuel tank 20.

As schematically represented in FIG. 2, some aircraft 10 further comprise a fuel line 30 that fluidly couples the fairing fuel tank 20 to the wing-center fuel tank 28, and in some such examples, the fuel line 30 extends at least partially through the fuselage 12 of the aircraft 10, such as over the wheel well 26. Such configurations may be beneficial to avoid the fuel line 30 being exposed to undesirable conditions within the wheel well 26.

In some examples, depending on the configuration of the aircraft 10, the fairing fuel tank 20 substantially fills the fairing volume 18 aft of the wheel well 26. Such a configuration therefore may take advantage of a maximum amount of otherwise unused space within the fairing volume 18.

Depending on the configuration of the aircraft 10, various additional aircraft systems also may be housed at least partially within the fairing volume 18. For example, as schematically represented in FIG. 2, some aircraft 10 further comprise a mid-fuselage exit door 32 (i.e., that provides access to and from an internal passenger compartment within the fuselage) and an exit-door escape slide 34 associated with the mid-fuselage exit door 32 and that is positioned at least partially within the fairing volume 18. In such aircraft 10, the fairing fuel tank 20 may be positioned at least partially aft, and optionally completely aft, of the exit-door escape slide 34. In some such examples, the fairing fuel tank 20 is positioned at least partially beneath the exit-door escape slide 34. In some examples, the aircraft 10 further comprises a pneumatic reservoir 36 positioned within the fairing volume 18 and configured to selectively inflate the exit-door escape slide 34. In such examples, the fairing fuel tank 20 may be positioned at least partially aft, and optionally solely aft, of the pneumatic reservoir 36. Again, such configurations may take advantage of otherwise unused space within the fairing volume 18.

As schematically represented in FIG. 2, in some examples of aircraft 10, the fairing fuel tank 20 comprises a flexible bladder 38. In particular, the flexible bladder 38 may be a self-sealing bladder to minimize risks associated with inadvertent damage to the wing-to-body fairing 16, such as a result of an inoperative landing gear scenario. So-called self-sealing fuel tanks typically comprise a thick layer of natural rubber in the center of a bladder wall. If the bladder is punctured, fuel from within the bladder interacts with the natural rubber of the bladder, and the fuel causes the rubber to swell to an extent that the hole is effectively sealed, thereby preventing further fuel leakage. Other configurations of flexible bladders 38 also may be used and incorporated into fairing fuel tanks 20 according to the present disclosure. Such flexible bladders 38 may be constructed in various sizes, shapes, and contours, such as to fill or substantially fill a desired region within the fairing volume 18.

With continued reference to FIG. 2, in some examples of aircraft 10, the wing-to-body fairing 16 comprises a fairing frame assembly 40 that is operatively coupled to the fuselage 12, and a fairing skin 42 that is operatively coupled to the fairing frame assembly 40 and that defines an outer surface of the wing-to-body fairing 16. For example, the fairing frame assembly 40 may comprise one or more of beams, ribs, spars, stringers, frame members, and the like, which collectively define the shape of the wing-to-body fairing 16 and operatively couple the fairing skin 42 relative to the fuselage 12 and with the fairing skin 42 defining an aerodynamic outer surface. In some such examples, the fairing fuel tank 20 is operatively supported by the fairing frame assembly 40. For example, the fairing fuel tank 20 may be directly supported by, engaged by, and/or coupled to the fairing frame assembly 40.

As also schematically represented in FIG. 2, in some examples, the aircraft 10 further comprises a fairing-fuel-tank frame assembly 44 that is operatively coupled to the fuselage 12 and that supports the fairing fuel tank 20. In other words, the fairing-fuel-tank frame assembly 44 may be separate or distinct from the fairing frame assembly 40. In particular, while the fairing frame assembly 40 may generally span an entirety of the wing-to-body fairing 16, the fairing-fuel-tank frame assembly 44 may be located solely in connection with the fairing fuel tank 20. In some such examples, the fairing frame assembly 40 does not support the fairing fuel tank 20. That is, the fairing fuel tank 20 may be directly supported by, engaged by, and/or coupled to the fairing-fuel-tank frame assembly 44 but not the fairing frame assembly 40. In such examples, the fairing frame assembly 40 need not be configured to operatively support the weight of the fairing fuel tank 20. As with the fairing frame assembly 40, the fairing-fuel-tank frame assembly 44 may comprise one or more of beams, ribs, spars, stringers, frame members, and the like, which collectively define the region of the fairing volume 18 within which the fairing fuel tank is 20 is positioned.

As schematically represented in FIG. 2, in some examples of aircraft 10, the fairing fuel tank 20 comprises two fairing fuel tanks 20, such as that are positioned lateral to each other within the fairing volume 18. Such a configuration permits for an even distribution of weight associated with the fuel held in the fairing fuel tanks 20, while providing additional space between the two fairing fuel tanks 20 for related structures (e.g., fuel lines and manifolds) or unrelated systems (e.g., associated with landing gear, escape slides, pneumatic systems, hydraulic systems, etc.).

Figure 3:
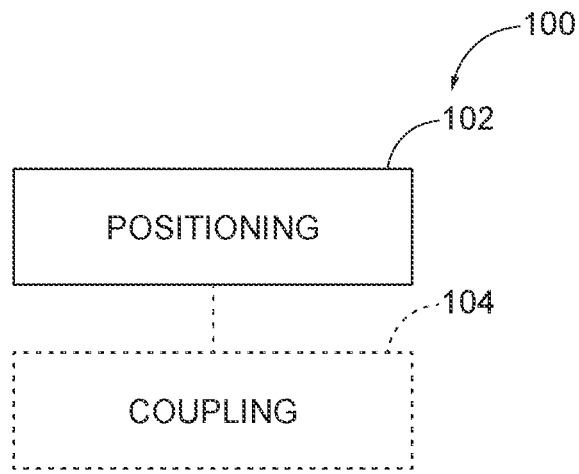
FIG. 3 is a flowchart schematically representing methods according to the present disclosure.
Figure 4:
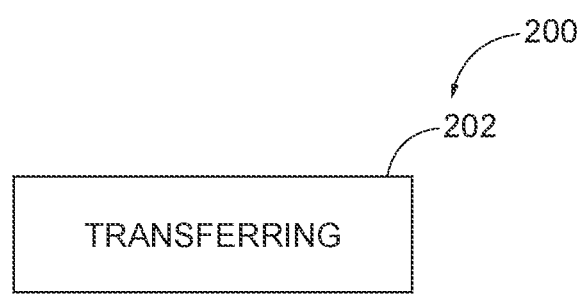
FIG. 4 is a flowchart schematically representing methods according to the present disclosure.

FIGS. 3 and 4 schematically provide flowcharts that represent illustrative, non-exclusive examples of methods according to the present disclosure. Some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIGS. 3 and 4 are not limiting, and other methods and steps are within the scope of the present disclosure, including methods having greater than or fewer than the number of steps illustrated, as understood from the discussions herein. The discussion below utilizes reference numerals corresponding to aircraft 10 discussed in detail above, indicating that the methods disclosed herein may be performed in connection with aircraft 10; however, the methods disclosed herein are not limited to being performed in connection with aircraft 10.

Starting with FIG. 3, methods 100 comprise at least positioning 102 a fairing fuel tank 20 within a fairing volume 18 defined between a wing-to-body fairing 16 and a fuselage 12 of an aircraft 10. Methods 100 additionally may be referred to as methods of manufacturing aircraft 10. As schematically indicated in FIG. 3, some methods 100 further comprise fluidly coupling 104 the fairing fuel tank 20 to a wing-center fuel tank 28 of the aircraft 10.

Turning to FIG. 4, methods 200 comprise transferring 202 fuel from a fairing fuel tank 20 positioned within a fairing volume 18 defined between a wing-to-body fairing 16 and a fuselage 12 of an aircraft 10 to and/or from a wing-center fuel tank 28 of the aircraft 10. Methods 200 additionally may be referred to as methods of operating aircraft 10. For example, in some methods 200, the transferring 202 is performed while the aircraft 10 is in flight.

Illustrative, non-exclusive examples of inventive subject matter according to the present disclosure are described in the following enumerated paragraphs:

A. An aircraft (10), comprising:
a fuselage (12);
wings (14) coupled to the fuselage (12);
a wing-to-body fairing (16) operatively coupled relative to the fuselage (12) and the wings (14) and defining a fairing volume (18) between the wing-to-body fairing (16) and at least the fuselage (12); and
a fairing fuel tank (20) positioned within the fairing volume (18).

A1. The aircraft (10) of paragraph A, wherein the fairing volume (18) has a forward region (22) and an aft region (24) positioned aft of the forward region (22), and wherein the fairing fuel tank (20) is positioned solely within the aft region (24).

A.1.1. The aircraft (10) paragraph A1, wherein the aft region (24) comprises a rear 50%, a rear 30%, or a rear 20% of the fairing volume (18).

A1.1.1. The aircraft (10) of paragraph A1.1, wherein the fairing fuel tank (20) substantially fills the aft region (24).

A2. The aircraft (10) of any of paragraphs A-A1.1.1, further comprising a wheel well (26) extending through the fairing volume (18), wherein the fairing fuel tank (20) is positioned solely aft of the wheel well (26).

A2.1. The aircraft (10) of paragraph A2, further comprising a wing-center fuel tank (28) positioned forward of the wheel well (26).

A2.1.1. The aircraft (10) of paragraph A2.1, wherein the fairing fuel tank (20) is fluidly coupled to the wing-center fuel tank (28).

A2.1.1.1. The aircraft (10) of paragraph A2.1.1, further comprising a fuel line (30) fluidly coupling the fairing fuel tank (20) to the wing-center fuel tank (28).

A2.1.1.1.1. The aircraft (10) of paragraph A2.1.1.1, wherein the fuel line (30) extends at least partially through the fuselage (12).

A2.2. The aircraft (10) of any of paragraphs A2-A2.1.1.1.1, wherein the fairing fuel tank (20) substantially fills the fairing volume (18) aft of the wheel well (26).

A3. The aircraft (10) of any of paragraphs A-A2.2, further comprising a mid-fuselage exit door (32) and an exit-door escape slide (34) associated with the mid-fuselage exit door (32) and that is positioned at least partially within the fairing volume (18), wherein the fairing fuel tank (20) is positioned at least partially aft of the exit-door escape slide (34).

A3.1. The aircraft (10) of paragraph A3, wherein the fairing fuel tank (20) is positioned at least partially beneath the exit-door escape slide (34).

A3.2. The aircraft (10) of any of paragraphs A3-A3.1, further comprising a pneumatic reservoir (36) positioned within the fairing volume (18) and configured to selectively inflate the exit-door escape slide (34), and wherein the fairing fuel tank (20) is positioned at least partially aft of the pneumatic reservoir (36).

A3.2.1. The aircraft (10) of paragraph A3.2, wherein the fairing fuel tank (20) is positioned solely aft of the pneumatic reservoir (36).

A4. The aircraft (10) of any of paragraphs A-A3.2.1, wherein the fairing fuel tank (20) comprises a flexible bladder (38).

A5. The aircraft (10) of any of paragraphs A-A4, wherein the wing-to-body fairing (16) comprises:
- a fairing frame assembly (40) operatively coupled to the fuselage (12); and
- a fairing skin (42) operatively coupled to the fairing frame assembly (40) and defining an outer surface of the wing-to-body fairing (16).

A5.1. The aircraft (10) paragraph A5, wherein the fairing fuel tank (20) is operatively supported by the fairing frame assembly (40).

A5.2. The aircraft (10) of any of paragraphs A5-A5.1, further comprising a fairing-fuel-tank frame assembly (44) operatively coupled to the fuselage (12) and supporting the fairing fuel tank (20).

A5.2.1. The aircraft (10) of paragraph A5.2 when not depending from paragraph A5.1, wherein the fairing frame assembly (40) does not support the fairing fuel tank (20).

A6. The aircraft (10) of any of paragraphs A-A5.2.1, wherein the fairing fuel tank (20) comprises two fairing fuel tanks (20).

A6.1. The aircraft (10) of paragraph A6, wherein the two fairing fuel tanks (20) are positioned lateral to each other within the fairing volume (18).

B. A method (100) comprising:
positioning (102) a fairing fuel tank (20) within a fairing volume (18) defined between a wing-to-body fairing (16) and a fuselage (12) of an aircraft (10).

B1. The method (100) of paragraph B, further comprising:
fluidly coupling (102) the fairing fuel tank (20) to a wing-center fuel tank (28) of the aircraft (10).

B2. The method (100) of any of paragraphs B-B1, wherein the aircraft (10) is the aircraft (10) of any of paragraphs A-A6.1.

B3. The method (100) of any of paragraphs B-B2, further comprising the subject matter of any of paragraphs A-A6.1.

C. A method (200) comprising:
transferring (202) fuel from a fairing fuel tank (20) positioned within a fairing volume (18) defined between a wing-to-body fairing (16) and a fuselage (12) of an aircraft (10) to and/or from a wing-center fuel tank (28) of the aircraft (10).

C1. The method (200) of paragraph C, wherein the transferring (202) is performed while the aircraft (10) is in flight.

C2. The method (200) of any of paragraphs C-C1, wherein the aircraft (10) is the aircraft (10) of any of paragraphs A-A6.1.

C3. The method (200) of any of paragraphs C-C2, further comprising the subject matter of any of paragraphs A-A6.1.

D. Use of a fairing fuel tank (20) positioned within a fairing volume (18) defined between a wing-to-body fairing (16) and a fuselage (12) of an aircraft (10) to power the aircraft (10).

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. An aircraft, comprising:
    a fuselage;
    wings coupled to the fuselage;
    a wing-to-body fairing operatively coupled relative to the fuselage and the wings and defining a fairing volume between the wing-to-body fairing and at least the fuselage;
    a fairing fuel tank positioned within the fairing volume; and
    a wheel well extending through the fairing volume, wherein the fairing fuel tank is positioned solely aft of the wheel well.

2. The aircraft of claim 1, wherein the fairing volume has a forward region and an aft region positioned aft of the forward region, wherein the fairing fuel tank is positioned solely within the aft region, and wherein the aft region comprises a rear 50% of the fairing volume.

3. The aircraft of claim 2, wherein the fairing fuel tank substantially fills the aft region.

4. The aircraft of claim 1, further comprising a wing-center fuel tank positioned forward of the wheel well.

5. The aircraft of claim 4, wherein the fairing fuel tank is fluidly coupled to the wing-center fuel tank.

6. The aircraft of claim 5, further comprising a fuel line fluidly coupling the fairing fuel tank to the wing-center fuel tank.

7. The aircraft of claim 6, wherein the fuel line extends at least partially through the fuselage.

8. The aircraft of claim 1, wherein the fairing fuel tank substantially fills the fairing volume aft of the wheel well.

9. The aircraft of claim 1, wherein the fairing fuel tank comprises a flexible bladder.

10. The aircraft of claim 1, wherein the wing-to-body fairing comprises:
    a fairing frame assembly operatively coupled to the fuselage; and
    a fairing skin operatively coupled to the fairing frame assembly and defining an outer surface of the wing-to-body fairing.

11. The aircraft claim 10, wherein the fairing fuel tank is operatively supported by the fairing frame assembly.

12. The aircraft of claim 10, further comprising a fairing-fuel-tank frame assembly operatively coupled to the fuselage and supporting the fairing fuel tank.

13. The aircraft of claim 12, wherein the fairing frame assembly does not directly support the fairing fuel tank.

14. The aircraft of claim 1, wherein the fairing fuel tank comprises two fairing fuel tanks positioned lateral to each other within the fairing volume.

15. An aircraft, comprising:
    a fuselage;
    wings coupled to the fuselage;
    a wing-to-body fairing operatively coupled relative to the fuselage and the wings and defining a fairing volume between the wing-to-body fairing and at least the fuselage, wherein the wing-to-body fairing comprises:
        a fairing frame assembly operatively coupled to the fuselage; and
        a fairing skin operatively coupled to the fairing frame assembly and defining an outer surface of the wing-to-body fairing;
    a fairing fuel tank positioned solely within an aft region of the fairing volume, wherein the fairing fuel tank comprises a flexible bladder;
    a wheel well extending through the fairing volume, wherein the fairing fuel tank is positioned solely aft of the wheel well, wherein the fairing fuel tank substantially fills the fairing volume aft of the wheel well;
    a wing-center fuel tank positioned forward of the wheel well;
    a fuel line fluidly coupling the fairing fuel tank to the wing-center fuel tank, wherein the fuel line extends at least partially through the fuselage; and
    a fairing-fuel-tank frame assembly operatively coupled to the fuselage and supporting the fairing fuel tank, wherein the fairing frame assembly does not directly support the fairing fuel tank.

16. The aircraft of claim 15, wherein the fairing fuel tank comprises two fairing fuel tanks positioned lateral to each other within the fairing volume.

17. A method of assembling the aircraft of claim 1, the method comprising:
    positioning the fairing fuel tank within the fairing volume.

18. The method of claim 17, further comprising:
    fluidly coupling the fairing fuel tank to a wing-center fuel tank of the aircraft.

19. A method of operating the aircraft of claim 1, the method comprising:
    transferring fuel from the fairing fuel tank to and/or from a wing-center fuel tank of the aircraft.

20. The method of claim 19, wherein the transferring is performed while the aircraft is in flight.

* * * * *